United States Patent [19]
Walter

[11] 4,291,304
[45] Sep. 22, 1981

[54] ELECTRO-OPTICAL DISPLAY DEVICE

[75] Inventor: Karl-Heinz Walter, Grafing, Fed. Rep. of Germany

[73] Assignee: Siemens Aktiengesellschaft, Berlin & Munich, Fed. Rep. of Germany

[21] Appl. No.: 944,365

[22] Filed: Sep. 21, 1978

[30] Foreign Application Priority Data

Sep. 29, 1977 [DE] Fed. Rep. of Germany ....... 2743907

[51] Int. Cl.³ .............................................. G08B 5/36
[52] U.S. Cl. .................................. 340/715; 340/642; 340/756; 340/765
[58] Field of Search ............... 340/635, 641, 642, 756, 340/759, 760, 765, 715; 350/334, 335, 336; 315/129, 133

[56] References Cited

U.S. PATENT DOCUMENTS

| | | | |
|---|---|---|---|
| 2,307,173 | 1/1943 | Vian | 340/760 |
| 3,781,863 | 12/1973 | Fujita | |
| 3,938,140 | 2/1976 | Garcia et al. | 340/765 |
| 3,943,500 | 3/1976 | Buchanan | 340/642 |
| 4,037,927 | 7/1977 | Krueger | |
| 4,054,368 | 10/1977 | Krueger et al. | |
| 4,104,620 | 8/1978 | Cronin | 315/129 X |

FOREIGN PATENT DOCUMENTS 2520650 10/1976 Fed. Rep. of Germany .
1372868 11/1974 United Kingdom .

OTHER PUBLICATIONS

Paul Smith; "Multiplexing Liquid-Crystal Displays"; Electronics; May 25, 1978, pp. 113-121.
Ian Holt; "LCD Environmental and Multiplex Problems Now Solved"; Electron; Sep. 15, 1977; pp. 48, 51, 53.
H. E. Bergt & K. H. Walter, "Optoelektronische Anzeigeeinheiten," Elektronik, vol. 4, 1976, pp. 36-42.
"Nachrichtentechnische Zeitung," Ntz-Kurier, 28, 1975, pp. K62-K63.

Primary Examiner—David L. Trafton
Attorney, Agent, or Firm—Hill, Van Santen, Steadman, Chiara & Simpson

[57] ABSTRACT

An electro-optical display device for representation of an item of information such as digits, the display device including a front and rear plate spaced apart to form a cavity for receiving a switchable medium, the front plate on a surface facing the medium being provided with at least one segmented electrode having segments and the rear plate on a surface facing the front plate and the medium being provided with a rear electrode assembly for each segmented electrode, the segments of the segmented electrode and the rear electrode assembly being energized to switch the optical properties in the medium characterized by front control electrodes being disposed on the front plate and electrically connected with selected one of the segments of each segmented electrode and a back control electrode disposed on the rear plate overlying the front control electrode so that an indication is made by one of the front control electrodes and the back control electrodes when the associated segment should be energized.

2 Claims, 2 Drawing Figures

ELECTRO-OPTICAL DISPLAY DEVICE

BACKGROUND OF THE INVENTION

The present invention is directed to electro-optical display devices for optically representing items of information such as digits, characters and the like, the display device having front and rear plates which are spaced apart to provide a chamber for receiving a switchable medium such as a liquid crystal layer with the front plate being provided with at least one segmented electrode whose segments are individually energized and the rear plate is provided with a rear electrode assembly so that selected portions of the optical material such as the liquid crystal layer can be optically switched between different optical conditions to form a display.

A liquid crystal display device utilizing segmented electrodes are known in contrast to active display devices do not produce their own light but merely modulate the outside or ambient light. Such display devices can be constructed in various different ways and have been commercially available for years in a number of different designs. A review of the possible display principles is given in an article by H. E. Bergt and K. H. Walter in *Elektronik*, Vol. 4, 1976, pp. 36–42, and a summarized review is given in "Nachrichtetechnische Zeitung" May 28, 1975, pp. k62–k63.

Even with careful production of the display device, it is not possible to prevent individual segments from failing to be energized when they are supposed to be energized during operation or from becoming erroneously activated during the course of operation. Defects of this kind, which can have various origins, for example breaks in the conductor path, break down of the individual drive lines, or short circuit in the region of the medium, frequently lead to a mis-display, which cannot be detected by the observer and which, in many types of uses, for example calibrated instrument or measuring device, cannot be permitted.

In active display devices, for example LED display devices, the representations can be checked by a relatively simple procedure. The segment currents are measured and compared with the offered or coded item of information and, if necessary, a false signal will be triggered. However, this type of monitoring cannot be used for passive display devices, in particular liquid crystal display devices in which the segment currents are several orders of magnitude lower and which currents fluctuate relatively considerably. Previously, a remedy for this situation was found in redundant representation such as disclosed in U.S. Pat. No. 4,037,927 or by utilizing more extensive segmentations, which were disclosed in U.S. Pat. No. 4,054,368. However, both these measurements undoubtedly involve considerable extra expenses with respect to production of the display device and/or the circuitry of the display device.

SUMMARY OF THE INVENTION

The present invention is directed to eliminating the unsatisfactory circumstances which occur with presently known passive display devices.

To accomplish these goals, an electro-optical display device for the representation of an item of information, such as digits, comprises a front and rear plate spaced apart to form a cavity for receiving a switchable medium, said front plate on a surface facing the medium being provided with at least one segmented electrode having segments and the rear plate on a surface facing the front plate and the medium being provided with a rear electrode assembly for each segmented electrode, said segment of the segmented electrode being selectively energized with the rear electrode assembly to switch the optical properties of the medium lying therebetween to create an image on the display device, the improvements comprising for each segmented electrode, the front plate having additional front control electrodes with each of the additional front control electrodes being electrically connected with an endangered electrode segment of the segmented electrode, said endangered electrode segments being a segment whose malfunction leads to a representation of another possible character instead of originally intended character being applied to the segmented electrode, and the rear plate having a back control electrode which overlies the front control electrodes so that energizing of the front control electrodes and the back electrode causes a switch in the optical state of the medium disposed therebetween.

The invention is based on the consideration that with practically every type of segmentation of the segmented electrodes in case of a defect of some of the segments lead to a representation which can be immmediately recognized as being erroneous or faulty. Thus, if control provisions are taken only for the remaining really critical segments of the segemented electrode, a fundamentally adequate monitoring can be achieved with a relatively low extra outlay. The checking outlay can be kept within limits in particular when, as prescribed by the invention, the control is carried out by means of additional electrodes on the two carrier plates.

Thus, the additional electrodes form control indications which can be compared with the selected endangered electrode segments to determine if the endangered electrode segments have been properly energized. While the control electrode may be energized at the same time as the endangered electrode segments, they are preferably energized in a two-step multiplex operation in which the selected segments of the segmented electrode are energized and then the control electrodes for the particular endangered segments of the segmented electrode are subsequently energized with the medium having sufficient retention so that the observer sees both indications simultaneously.

DESCRIPTION OF THE PREFERRED EMBODIMENTS

Figure 1:
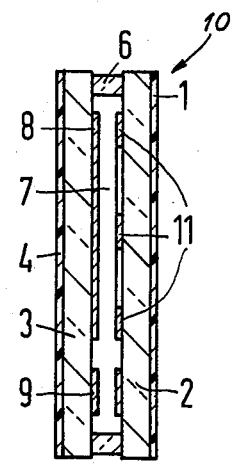
FIG. 1 is a cross-sectional view of a liquid crystal display device in accordance with the present invention.

The principles of the present invention are particularly useful in an electro-optical display device generally indicated at 10 in FIG. 1. The display device 10 illustrates a single digit display utilizing a liquid crystal material as the switchable medium. The device operates in accordance with the principle of so-called rotary cell and includes a front linear polarizer 1, a front carrier plate 2, a rear carrier plate 3 and a rear linear polarizer 4, whose direction of polarization is parallel to the direction of polarization of the front polarizer 1. The two carrier plates 2 and 3 are spaced apart by a frame 6 to form a chamber 7 which contains the liquid crystal layer, which is the switchable material. Further details regarding the production and operation of a liquid crystal display device utilized and operated as a rotary cell are described in British Pat. No. 1,372,868.

Figure 2:
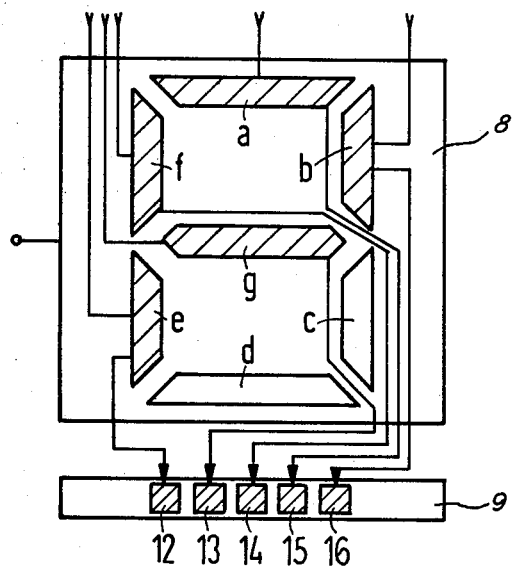
FIG. 2 is a schematic illustration of the segmented electrode arrangement for the liquid crystal display device in accordance with FIG. 1.

On the surfaces which face each other, the two carrier plates 2 and 3 are each provided with separately operable conducting coatings. As best seen in FIG. 1, the rear carrier plate 3 has a rear electrode assembly 8 which is illustrated as a continuous electrode and a back control electrode 9. The front plate 2 has a segmented electrode 11 which contains seven individually actuated segments which are arranged in a pattern to form a digit "8". As best illustrated in FIG. 2, the rear electrode assembly 8 for the digit presentation overlies the entire configuration of the front digit or segmented electrode 11. The segmented electrode 11 is composed of a top transverse electrode or segment a, a central transverse segment g, a lower transverse segment d, an upper right side segment b, a lower right side segment c, a lower left side segment e, and an upper left side segment f. Each of these segments a through g is provided with an individual supply line, which enables them to be individually actuated or energized to switch the optical properties of the layer of material disposed beneath the individual segment.

When a display of a character or digit is being made by the device 10, two possible types of malfunctions can occur. The first of these malfunctions is a failure for a selected segment to be energized when it is supposed to be energized to help produce the particular character. The second type of malfunction is a misactuation of a segment causing it to be energized when it is not supposed to be energized. While the malfunction of some of the segments will produce an indication which is obviously erroneous to the viewer, the malfunction of certain of the segments will produce a character, which looks proper although it is not the intended character or indication. From an analysis of the various digits 0–9, which can be displayed by the segmented electrode 11, it is seen that a malfunction of the segments a, b, e, f and g which are indicated with shading in FIG. 2, can erroneously produce an indication of a digit other than the particular digit that is supposed to be indicated or displayed. For example, if a digit 9 is to be displayed and the segment f fails to be energized, a digit 3 will be erroneously displayed. In all of these cases, the observer is unable to immediately detect an incorrect or erroneous display or indication. Therefore, the enumerated segments a, b, e, f and g in accordance with the present invention are considered endangered electrode segments and are monitored.

For this purpose, control segments or electrodes 12, 13, 14, 15 and 16 are provided on the front carrier plate 2 in a space below the area of the segmented electrode 11. Each of the front control electrode is associated with one of the endangered electrode segments as indicated in FIG. 2. For example, control electrode 12 is associated with segment e. As illustrated, the rear plate 3 has a rear or back control electrode 9, which is aligned with the control electrodes 12–16 and overlies these.

The display device 10 is operated in the following manner. In a first step, the seven segments a–g are energized in accordance with the desired character to be displayed and the rear electrode 8 is also activated. In a second step, the control electrodes such as 12–16 and the rear electrode 9 are energized. Expediently, all the control electrodes are switched on and off periodically, for example in seconds timing.

In contrast with a liquid crystal display without control facilities, the described exemplary embodiment will have a higher production cost. However, it is believed that the added features fully justify these expenses. For example, the device 10 in comparison with the conventional display device will require one extra terminal for the rear control electrode 9. In addition, a more complex conductor layer will be required to interconnect the control electrodes 12–16 with the terminals for the endangered electrode segments a, b, e, f and g. Finally, the liquid crystal material preferably is selected to permit a two-step multiplex operation. Finally, the drive components for the device are preferably designed for the two-step multiplexing operation and contain additional logic in order to operate the signals to be controlled in a flashing device for switching the control electrodes on and off.

A device according to the invention is monitored in the following manner. During operation, the selected segments for a symbol to be applied on the device must be energized along with the control indicator. If the energized segment agrees with the energized control electrode, no invalid characters are being represented. The control elements or electrodes are either switched on or switched off. If only one control electrode is incorrectly indicated and does not match its associated segment, the represented information on the display will also be considered faulty.

The invention is not limited to the illustrated embodiment. Thus, a liquid crystal display device having more than one segmented electrode may utilize control electrodes for each of the segmented electrodes. In addition, additional electrodes such as comma electrodes or decimal point electrodes or segments may be present in the device and be provided with a corresponding associated control electrode. Thus, the device can be utilized in precision and calibrated measuring devices such as scales or instruments. Also the device can be utilized to display a quantity such as for a a cash register or a gasoline pump.

While the above device was described as utilizing a liquid crystal material as the passive electro-optical display material, under certain circumstances other types of devices, which use other switchable display layers or materials with segmented electrodes so that selected areas of the material are switched to change their optical capabilities or characteristics, can be utilized with the control electrodes of the present invention. In addition, the character to be displayed by the segmented electrode can utilize a different segment pattern such as the segment pattern disclosed in the German Offenlegungsschrift No. 25 20 650 or the segmented electrode may produce entirely different symbol or even represent a matrix configuration. Moreover, under certain circumstances, it can also be advisable to supplement the optical control by means of an additional electronic control within the drive component. This can be effected, for example, by recording the capacity of the segment currents which can easily be increased when required, for example, by connecting additional capacitors. Moreover, the technical expert is at liberty to combine the multiplex step operation for controlling the endangered segments with a multi-step multiplex operation for the display of a given representation on the electrodes in a manner disclosed by U.S.

Pat. No. 3,781,863 which uses at least two electrodes in the rear electrode assembly.

Although various minor modifications may be suggested by those versed in the art, it should be understood that I wish to embody within the scope of the patent warranted hereon, all such modifications as reasonably and properly come within the scope of my contribution to the art.

I claim:

1. A process for operating an electro-optical display device, said device comprising a front and rear plate spaced apart to form a cavity for receiving a switchable medium, said front plate on a surface facing the medium being provided with at least one segmented electrode having segments and the rear plate on a surface facing the front plate and the medium being provided with a rear electrode assembly for each segmented electrode, said segments of the segmented electrode being individually energized along with the rear electrode assembly to switch the optical properties of the medium lying therebetween, an additional front control electrode electrically connected with each of the endangered electrode segments of the segmented electrode, said endangered electrode segments being segments whose malfunction leads to a representation of another possible character from the originally intended character being applied to the segmented electrode and a back control electrode disposed on the rear plate overlying the control electrode, said process comprising energizing the electrodes with a multiplex operation with two steps, said operation including during the first step of the two steps energizing the selected segments of the segmented electrode and its associated rear electrode assembly to display the selected information and during the last step energizing the back and front control electrodes.

2. A process according to claim 1, wherein each of the segmented electrodes comprises seven segments which are arranged in a pattern to form the digit 8 and wherein five front control electrodes are provided for each segmented electrode and wherein the endangered electrode segments include the upper and middle transverse segments, the upper and lower left-hand side segments and the upper right-hand side segments of the segmented electrode, and wherein the last step of the multiplex operation only produces an indication as the control electrodes associate with the selected five endangered electrodes.

* * * * *